UNITED STATES PATENT OFFICE.

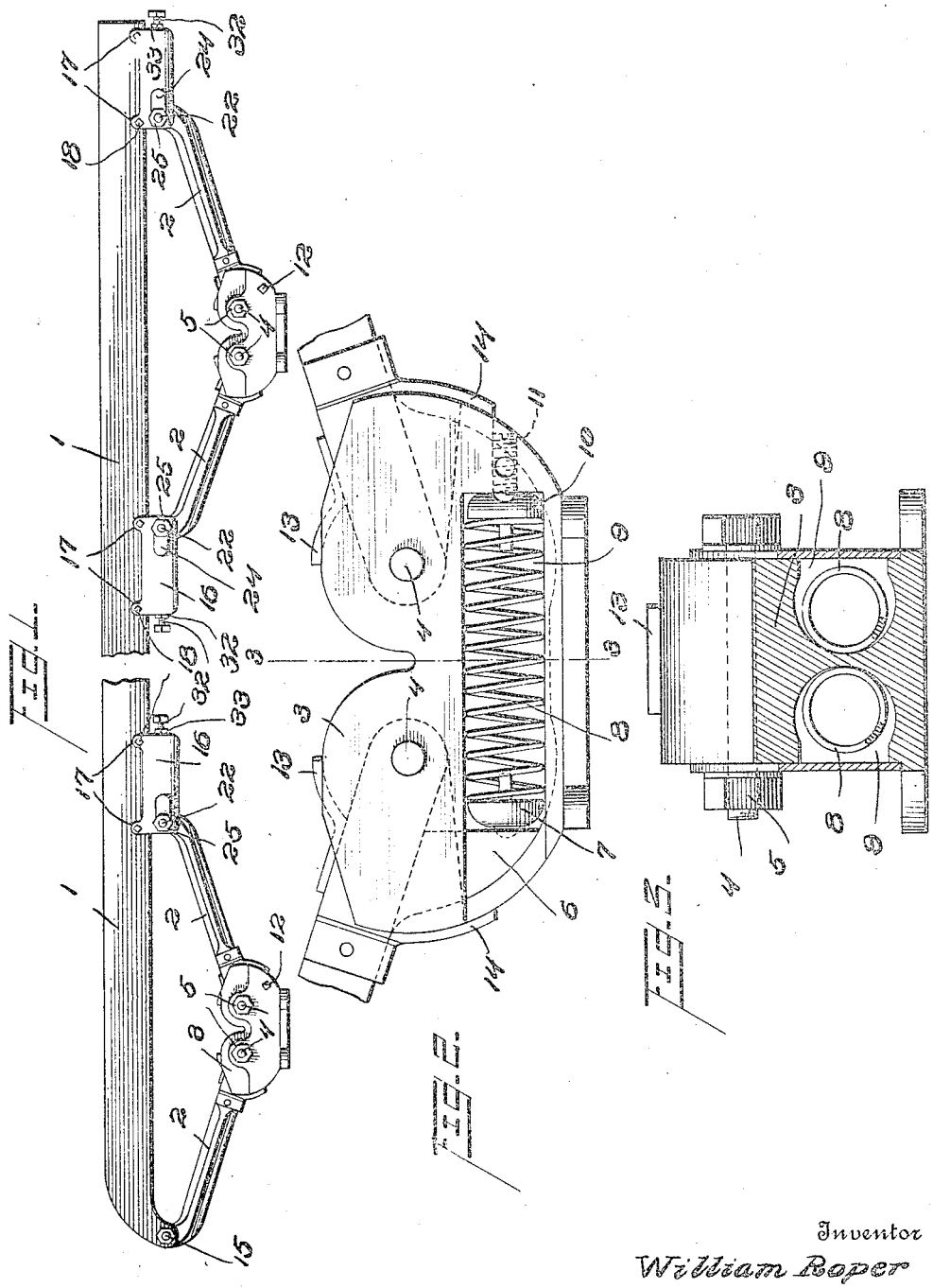

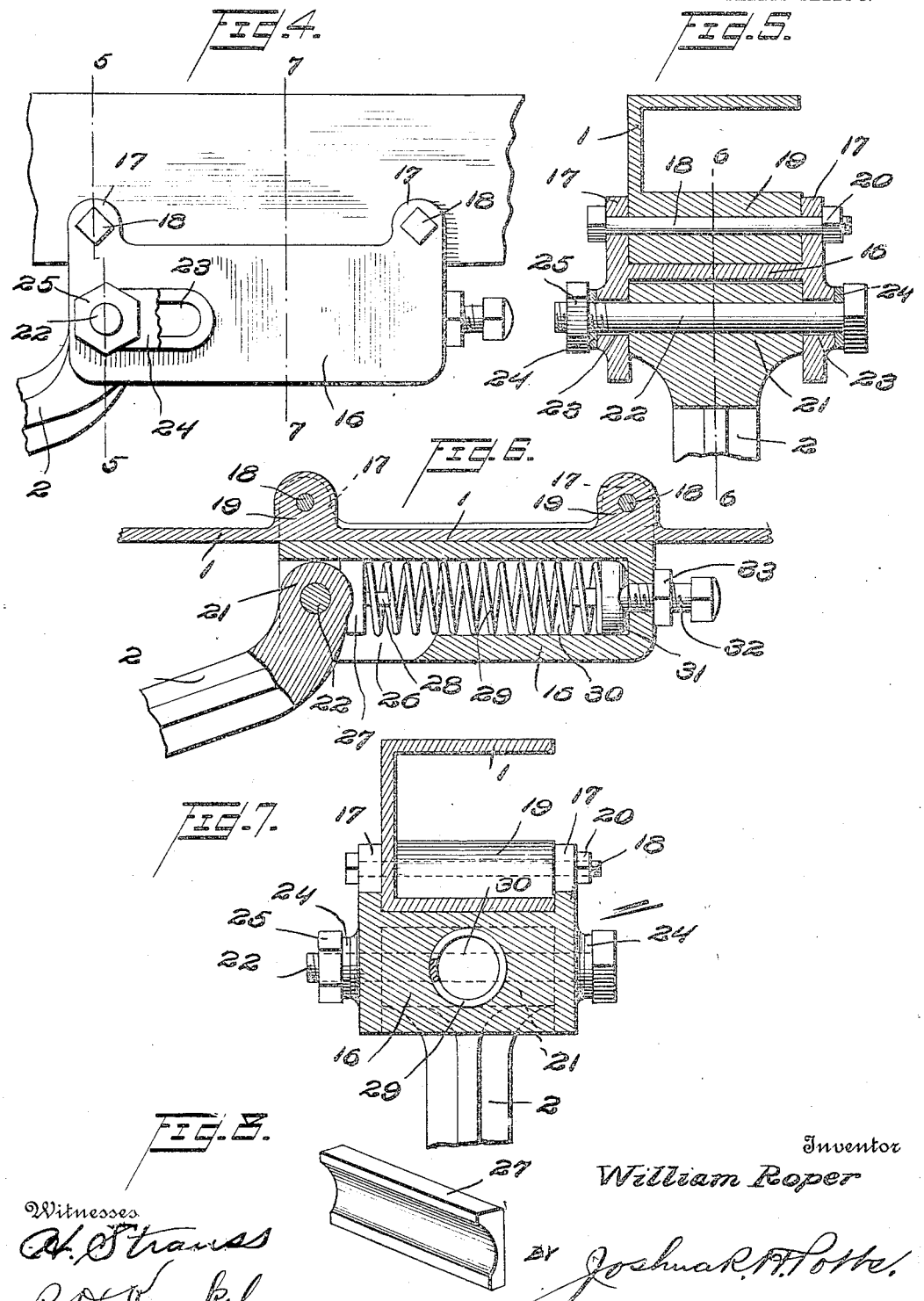

WILLIAM ROPER, OF PHILADELPHIA, PENNSYLVANIA.

VEHICLE-SPRING.

1,049,001.

Specification of Letters Patent. Patented Dec. 31, 1912.

Application filed May 15, 1912. Serial No. 697,425.

*To all whom it may concern:*

Be it known that I, WILLIAM ROPER, a citizen of the United States, residing at Philadelphia, in the county of Philadelphia and State of Pennsylvania, have invented certain new and useful Improvements in Vehicle-Springs, of which the following is a specification.

My invention relates to improvements in vehicle springs, and more particularly to an improved vehicle spring which operates as a shock absorber, the object of the invention being to provide improved mounting between the vehicle frame and the end of a spring-pressed link, whereby the vehicle will be cushioned and the shock which would be otherwise permitted to the frame, will be absorbed.

A further object is to utilize in connection with an improved construction of spring such as set forth in my application for patent filed January 27, 1912, improved means for connecting the end or ends of the pivoted link or links with the vehicle frame.

A further object is to provide an improved spring mounting for the ends of spring-pressed pivoted links, which permits of adjustment of the spring in accordance with the load.

With these and other objects in view, the invention consists in certain novel features of construction and combinations and arrangements of parts, as will be more fully hereinafter described and pointed out in the claims.

In the accompanying drawings: Figure 1, is a broken view in side elevation illustrating my improvements connected to the side bar of an automobile frame. Fig. 2, is a view on an enlarged scale in elevation of one of the spring heads with the side plate removed. Fig. 3, is a view in cross section on the line 3—3 of Fig. 2. Fig. 4, is a view in side elevation on an enlarged scale illustrating my improved mounting for the end of the pivoted link at its point of juncture with the automobile frame. Fig. 5, is a view in section on the line 5—5 of Fig. 4. Fig. 6, is a view in section on the line 6—6 of Fig. 5. Fig. 7, is a view in section on the line 7—7 of Fig. 4, and Fig. 8, is a detail view of the cushion block 27.

1, represents the side bar of an automobile or other vehicle frame which is supported by my improved construction of springs. These springs each comprise links 2, 2, and each pair of links is pivotally secured in a spring head 3 by means of bolts 4, and nuts 5, and have laterally projecting enlargements 6. These enlargements 6 bear against cushion blocks 7, and the latter are positioned against the ends of coiled springs 8 located in chambers 9 in the opposite sides of head 3. In the opposite ends of these chambers, jack pins 10 are located, and against which screws 11 bear to adjust the tension of the springs. These screws are preferably locked by jam screws 12 to securely hold them after adjustment.

The links 2 have plates 13 and 14 secured thereto to cover the recessed ends of the head 3, and as will be readily seen, the springs 8 tend always to press the outer ends of the links 2, 2, upwardly. This spring head construction is covered more fully in my application above referred to, and while of somewhat different design, in its essentials it is the same.

The front spring has its forward link pivotally connected by a bolt 15 to the end of the frame bar 1. The rear link 2 of this front spring and both links of the rear spring are connected to bar 1 by my improved spring mounting which will now be described. Each of said spring mountings is provided with a casing 16, and this casing is of general rectangular form and provided with perforated ears 17 for the reception of bolts 18 to secure the same to bar 1. These bolts 18 project through enlargements 19 on bar 1, and are secured by nuts 20 so that the casings are rigidly fixed to the bar. As all of these casings are constructed alike, the description hereinafter of one will apply alike to all. The link 2 at its free end is made with a transverse cylindrical enlargement 21 through which a bolt 22 projects. This bolt 22 extends through elongated slots 23 in the sides of casing 16 through covering plates 24, normally closing said slots, and is secured by a nut 25. The casing 16 is provided in its forward end with a relatively large recess 26 in which a cushion block 27 is located. This cushion block fits the enlarged end 21 of link 2, and is provided with a rearwardly projecting pin 28 which projects into the end of a coiled spring 29. This coiled spring 29 is housed in a cylindrical bore 30 in said casing, and at its inner end bears against a jack pin 31. This jack pin 31 is engaged by a set screw 32 having a jam nut 33 thereon, so that the tension of spring 29 may be varied.

In operation, the downward movement of the frame 1 or the upward movement of the axle causes the frame 1 to move toward the spring head 3. This action is resisted, of course, by the springs 8, but is also resisted by the springs 29, as the links 21 at their upper ends will move longitudinally of frame bar 1. These springs 29 therefore act as shock absorbers, as well as assisting the springs 8 to cushion the vehicle. Furthermore, they are readily adjusted in accordance with the load, and this adjustment may be varied to suit conditions.

While I have shown in Fig. 1, a preferred arrangement of my improvements, I would have it understood that I am not limited to this particular arrangement but might vary the arrangement and location of the spring connections between the links and the frame.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In combination with a pivoted link, a casing of general rectangular form in cross section having a flat face adapted to be positioned against a support, perforated bolt receiving ears on said casing adapted to be positioned at opposite sides of the support, said casing having a longitudinal cylindrical bore and an angular transversely enlarged recess at one end, the side walls of said recessed portion having longitudinal slots therein, said link having a transversely enlarged cylindrical end positioned in the recess, a bolt projected through said slots and enlarged end of the link, a coiled spring in the cylindrical bore and projecting into the recess, and a block positioned in the recess, of greater width than the bore, said block having a curved face contacting with the cylindrical end of the link, and a flat face against which one end of the spring bears, substantially as described.

2. In combination with a pivoted link, a casing of general rectangular form in cross section having a flat face adapted to be positioned against a support, perforated bolt receiving ears on said casing adapted to be positioned at opposite sides of the support, said casing having a longitudinal cylindrical bore and an angular transversely enlarged recess at one end, the side walls of said recessed portion having longitudinal slots therein, said link having a transversely enlarged cylindrical end positioned in the recess, a bolt projected through said slots and enlarged end of the link, a coiled spring in the cylindrical bore and projecting into the recess, a block positioned in the recess, of greater width than the bore, said block having a curved face contacting with the cylindrical end of the link, a flat face against which one end of the spring bears, a jack pin in the inner end of said bore having a flat spring engaging face, a screw projected through the end of the casing into engagement with the jack pin, and a jam nut on said screw, substantially as described.

In testimony whereof I have signed my name to this specification in the presence of two subscribing witnesses.

WILLIAM ROPER.

Witnesses:
THEODORE F. OECHSLE,
R. H. KRENKEL.